US010029682B2

(12) United States Patent
Gunaratne (10) Patent No.: US 10,029,682 B2
(45) Date of Patent: Jul. 24, 2018

(54) SURROUNDING VEHICLE CLASSIFICATION AND PATH PREDICTION

(71) Applicant: Toyota Motor Engineering & Manufacturing North America, Inc., Erlanger, KY (US)

(72) Inventor: Pujitha Gunaratne, Windsor (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 240 days.

(21) Appl. No.: 15/003,961

(22) Filed: Jan. 22, 2016

(65) Prior Publication Data

US 2017/0210378 A1    Jul. 27, 2017

(51) Int. Cl.
*B60W 30/09* (2012.01)
*B60W 10/20* (2006.01)
(Continued)

(52) U.S. Cl.
CPC ............ *B60W 30/09* (2013.01); *B60W 10/04* (2013.01); *B60W 10/20* (2013.01);
(Continued)

(58) Field of Classification Search
CPC ...... B60W 30/09; B60W 10/20; B60W 10/04; B60W 30/0956; B60W 2550/306; B60W 2550/10; B60W 2520/10; B60W 2720/10; B60W 2710/20; B60W 2900/00; B60W 2420/52

See application file for complete search history.

(56) References Cited

U.S. PATENT DOCUMENTS 5,558,370 A * 9/1996 Behr .................. B60R 21/0132
                                              242/374
5,959,552 A * 9/1999 Cho ........................ B60R 19/38
                                              180/167
(Continued)

OTHER PUBLICATIONS

Kim et al. "Towards Dependable Autonomous Driving Vehicles: A System-Level Approach", Undated, (in 4 pages).
(Continued)

*Primary Examiner* — Richard M Camby
(74) *Attorney, Agent, or Firm* — Christopher G. Darrow; Darrow Mustafa PC (57) ABSTRACT

A host vehicle can be configured to monitor an external environment of the host vehicle using a sensor system. The host vehicle can detect an object in the external environment of the host vehicle. The object can be classified as a surrounding vehicle. The host vehicle can determine a driving behavior of the surrounding vehicle. The driving behavior can be based on any one of a predetermined vehicle characteristics and current driving characteristics of the surrounding vehicle. The predetermined vehicle characteristics can be based on a type of the surrounding vehicle. The current driving characteristics can be based on observations obtained by the sensor system. The host vehicle can predict a trajectory of the surrounding vehicle based on the determined driving behavior. The host vehicle can follow a safe path based on the predicted trajectory responsive to detecting one or more sensors in a failed state.

15 Claims, 4 Drawing Sheets

(51) Int. Cl.
*B60W 10/04* (2006.01)
*B60W 30/095* (2012.01)

(52) U.S. Cl.
CPC ..... *B60W 30/0956* (2013.01); *B60W 2420/52* (2013.01); *B60W 2550/10* (2013.01); *B60W 2550/302* (2013.01); *B60W 2550/306* (2013.01); *B60W 2710/20* (2013.01); *B60W 2720/10* (2013.01); *B60W 2900/00* (2013.01)

(56) References Cited

U.S. PATENT DOCUMENTS

| | | |
|---|---|---|
| 8,457,827 B1 | 6/2013 | Ferguson et al. |
| 8,589,014 B2 | 11/2013 | Fairfield et al. |
| 8,660,734 B2 | 2/2014 | Zhu et al. |
| 8,676,487 B2 | 3/2014 | Sakai et al. |
| 8,793,046 B2 | 7/2014 | Lonbrozo et al. |
| 9,630,619 B1 * | 4/2017 | Kentley ................ B60W 30/09 |
| 2017/0120904 A1 * | 5/2017 | Kentley ................ B60W 30/09 |

OTHER PUBLICATIONS

Sivaraman et al., "Learning Multi-Lane Trajectories using Vehicle-Based Vision", IEEE International Conference on Computer Vision Workshops, 2011, pp. 2070-2076 (7 pages).

Sivaraman et al., "Dynamic Probabilistic Drivability Maps for Lane Change and Merge Driver Assistance", IEEE Transactions on Intelligent Transportation Systems, vol. 15, No. 5, Oct. 2014, pp. 2063-2073 (11 pages).

* cited by examiner

FIG. 4D ined forms. The terms "a" and "an," as used herein, are defined as one or more than one. The term "plurality," as used herein, is defined as two or more than two. The term "another," as used herein, is defined as at least a second or more.

SURROUNDING VEHICLE CLASSIFICATION AND PATH PREDICTION

TECHNICAL FIELD

The present disclosure relates generally to vehicles, and, more particularly, to trajectory prediction in vehicles.

BACKGROUND

Vehicles commonly include sensors for monitoring an external environment of the vehicle. In some instances, one or more of the sensors can fail while the vehicle is in operation. As a result, some vehicles execute fail-safe maneuvers in the event of such sensor failure. Such fail-safe maneuvers can include, for example, pulling the vehicle over to a side of a road.

SUMMARY

In one aspect of the disclosed embodiments, the present disclosure is related to a system for operating a host vehicle on a roadway. The system can include a sensor system configured to monitor an external environment of the host vehicle as the host vehicle travels along the roadway. The system can further include a first database including one or more predetermined vehicle characteristics indicative of at least one driving behavior associated with a plurality of vehicles having a determined type for a given traffic situation in the surround. The system can further include a processor being programmed to initiate instructions stored on a memory. The instructions can include detecting, using the sensor system, an object in the external environment of the host vehicle. The instructions can include determining a classification for the object. If the determined classification for the object is a vehicle surrounding the host vehicle, the instructions can include determining the type of the surrounding vehicle. The instructions can further include obtaining one or more current driving characteristics of the surrounding vehicle as it travels along the roadway using the sensor system. The instructions can further include retrieving, from the first database, the predetermined vehicle characteristics for the determined type of the surrounding vehicle. The instructions can further include predicting a trajectory of the surrounding vehicle based on at least one of the one or more current driving characteristics or the predetermined vehicle characteristics.

In another aspect of the disclosed embodiments, the present disclosure is directed to a method for operating a host vehicle on a roadway. The method can include detecting, using a sensor system in the host vehicle, an object in an external environment of the host vehicle. The method can include determining a classification for the object. If the determined classification for the object is a vehicle in the external environment surrounding the host vehicle, the method can include determining a type of the surrounding vehicle. The method can further include obtaining one or more current driving characteristics of the surrounding vehicle as it travels on the roadway using the sensor system. The method can further include retrieving, from a first database, one or more predetermined vehicle characteristics for the determined type, the one or more predetermined vehicle characteristics indicative of at least one driving behavior associated with a plurality of vehicles having the determined type. The method can further include predicting a trajectory of the surrounding vehicle on the roadway based on at least one of the one or more current driving characteristics or the one or more predetermined vehicle characteristics.

In another aspect of the disclosed embodiments, the present disclosure is related to a method for operating a host vehicle on a roadway. The method can include detecting an object in an external environment of the host vehicle using a sensor system. The method can include determining a classification for the object. If the determined classification for the object is a vehicle surrounding the host vehicle, the method can include determining one or more characteristics for the surrounding vehicle indicative of at least one driving behavior. The method can further include predicting a trajectory of the surrounding vehicle on the roadway based on the one or more characteristics.

DETAILED DESCRIPTION

This detailed description relates to systems and methods for classification of surrounding vehicles and path prediction in a host vehicle. The host vehicle includes a sensor system for monitoring an external environment of the vehicle. The host vehicle can detect a surrounding vehicle in the external environment. The host vehicle can determine a type of the surrounding vehicle, and can retrieve one or more predetermined vehicle characteristics for the surrounding vehicle based on the determined type. The one or more predetermined vehicle characteristics can be used to predict a trajectory for the surrounding vehicle. The host vehicle can determine a safe trajectory based on the predicted trajectory, and the host vehicle can follow the safe trajectory responsive to detecting a failed sensor in the sensor system. Arrangements describe herein can, for example, provide the vehicle with a safe trajectory to follow responsive to detecting at least one of the sensors in the sensor system being in a failed state.

Detailed examples are disclosed herein; however, it is to be understood that the disclosed examples are intended only to facilitate the description. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various examples are shown in FIGS. 1-5, but the examples are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the examples described herein can be practiced without these specific details.

Figure 1A:
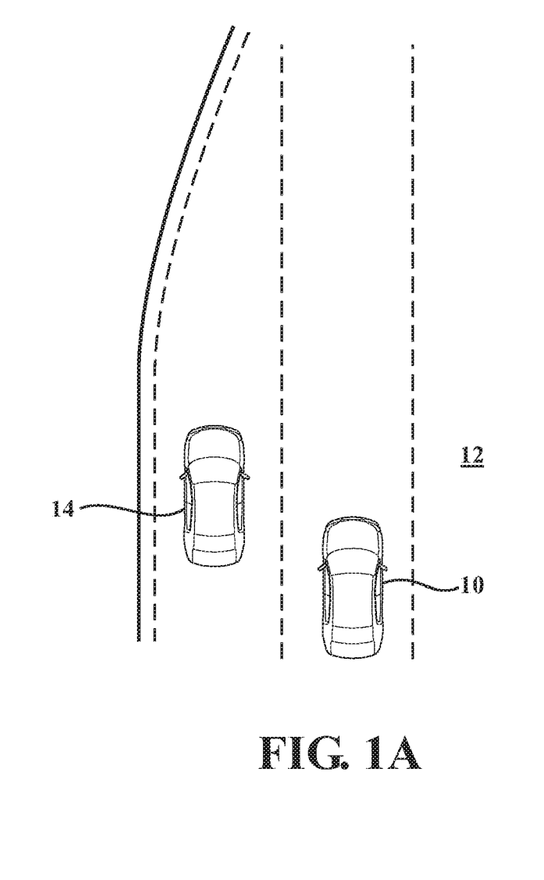
FIGS. 1A and 1B are top views of an example of a roadway including a host vehicle having an external environment and surrounding vehicle located therein according to one aspect of the disclosure.
Figure 1B:
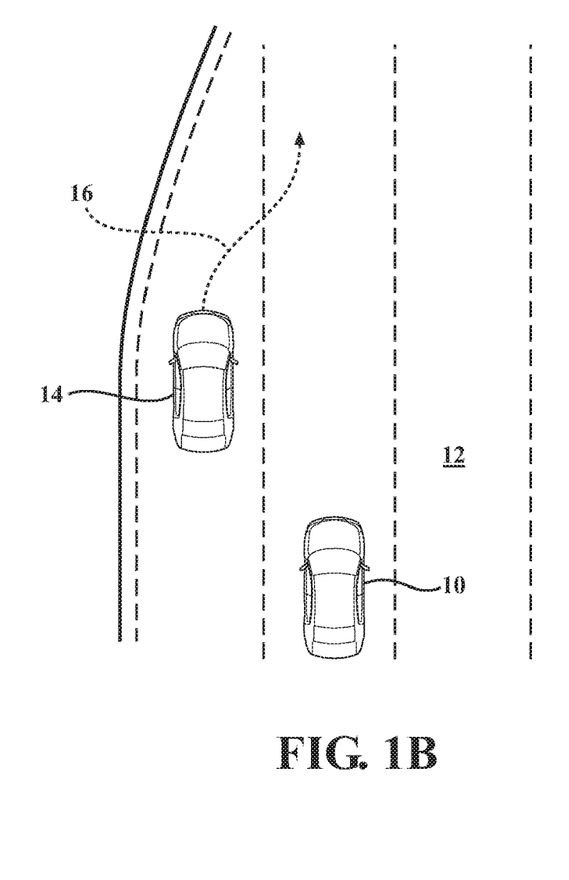

Referring now to FIG. 1A and FIG. 1B, top views of an example of a roadway including a host vehicle 10 having an external environment 12 and a surrounding vehicle 14 located therein are shown. The system can include a host vehicle 10. The host vehicle 10 can be any suitable type of vehicle. The host vehicle 10 can be any form of transportation that is at least partially motorized. In one or more arrangements, the host vehicle 10 can be an automobile. While arrangements will be described herein with respect to automobiles, it should be understood that examples and implementations are not limited to automobiles. In one or more arrangements, the host vehicle 10 can be a watercraft, an aircraft, a space craft, a golf cart, a motorcycle, and/or any other form of transportation that is at least partially motorized.

The host vehicle 10 can be located in any location. For example, the host vehicle 10 can be traveling along a roadway. The host vehicle 10 can have an associated external environment 12. The external environment 12 can be areas surrounding the host vehicle 10, and/or any portion(s) thereof. One or more objects can be located in the external environment 12 of the host vehicle 10. For example, one or more objects can be a vehicle surrounding the host vehicle 10 that is also traveling along the roadway. There can be any number of surrounding vehicles 14 in the external environment 12 of the host vehicle 10. While only one surrounding vehicle 14 is shown in FIGS. 1A and 1B, it will be understood that arrangements described herein are not limited in this respect. In fact, there can be greater than one surrounding vehicle 14 located in the external environment 12 of the host vehicle 10. Additionally or alternatively, there can be no surrounding vehicles located in the external environment 12 of the host vehicle 10.

As will be described herein, the host vehicle 10 can monitor the external environment 12 of the host vehicle 10. The host vehicle 10 can detect an object located in the external environment 12 of the host vehicle 10. The host vehicle 10 can classify the object as the surrounding vehicle 14. The host vehicle 10 can predict a trajectory 16 for the surrounding vehicle 14. The predicted trajectory 16 can be a course of action, direction, orientation, and/or travel path for the surrounding vehicle 14. As will be discussed below, the predicted trajectory 16 can be determined based on any of one or more predetermined vehicle characteristics, and one or more current driving characteristics for the surrounding vehicle 14. The predetermined vehicle characteristics can be based on a type of the surrounding vehicle 14. The current driving characteristics can be obtained sensor data from a sensor system of the host vehicle 10.

Figure 2:
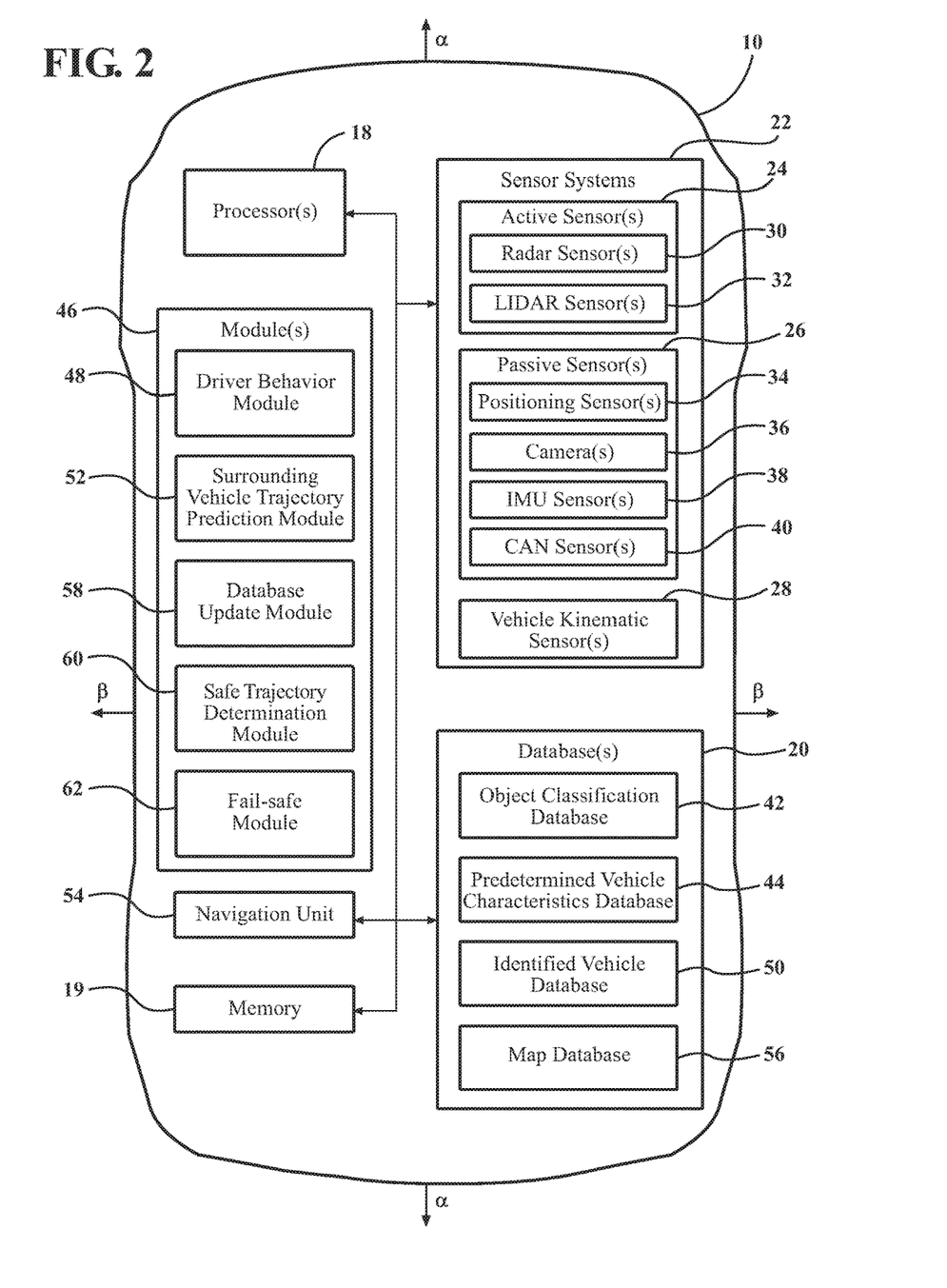
FIG. 2 is a schematic block diagram of an example of the host vehicle of FIGS. 1A and 1B being configured to predict trajectories of the surrounding vehicle according to one aspect of the disclosure.

Referring now to FIG. 2, a schematic block diagram of an example of the host vehicle 10 being configured to predict the trajectory 16 of the surrounding vehicle 14 is shown. The host vehicle 10 can include various elements. Some of the possible elements of the host vehicle 10 are shown in FIG. 2 and will now be described. However, it should be understood that it is not necessary for the host vehicle 10 to include all of the elements shown in FIG. 2 or described herein. The host vehicle 10 can have any combination of the various elements shown in FIG. 2. Furthermore, the host vehicle 10 can have additional elements to those shown in FIG. 2. Further, while various elements are shown as being located within the host vehicle 10 in FIG. 2, it should be understood that one or more of these elements can be located external to the host vehicle 10. Further, the elements shown may be physically separated by large distances.

The host vehicle 10 can include one or more processor(s) 18. The processor(s) 18 can be any component or group of components that are configured to execute any of the processes described herein or any form of instructions to carry out such processes or cause such processes to be performed. The processor(s) 18 can be implemented with one or more general-purpose and/or special-purpose processors. Examples of suitable processor(s) 18 can include microprocessors, microcontrollers, digital signal processors, and other circuitry that can execute software. Further examples of suitable processor(s) 18 include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 18 can include at least one hardware circuit (e.g., an integrated circuit) configured to carry out instructions contained in program code. In arrangements in which there is a plurality of processor(s) 18, such processors can work independently from each other or one or more processors can work in combination with each other. In one or more arrangements, the processor 18 can be a main processor of the host vehicle 10. For instance, the processor 18 can be an electronic control unit (ECU).

The host vehicle 10 can include computer readable medium. In one or more arrangements, the computer readable medium can be memory 19. The memory 19 can include volatile and/or non-volatile memory. Examples of suitable memory 19 includes RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The memory 19 can include instructions in program code stored thereon. Such instructions can be executed by the processor(s) 18, and/or one or more modules of the host vehicle 10. In one or more arrangements, the memory 19 can be a component of the processor(s) 18. In one or more arrangements, the memory 19 can be operatively connected to the processor(s) 18, and/or one or more modules of the host vehicle 10 and used thereby. Operatively connected can include direct or indirect connections, including connections without direct physical contact.

The host vehicle 10 can include one or more database(s) 20 for storing one or more types of data. The database(s) 20 can be a component of the memory 19, the processor(s) 18, or the database(s) 20 can be operatively connected to the processor(s) 18 and/or memory 19 for use thereby.

The host vehicle 10 can also include a sensor system 22. The sensor system 22 can include one or more sensors. The one or more sensors can be configured to monitor something in the external environment 12 of the host vehicle 10. In one or more arrangements, the one or more sensors can be configured to monitor in real-time. Real-time can be a level of processing responsiveness that a user or system senses as sufficiently immediate for a particular process or determination to be made, or that enables the processor to keep up with some external process. The sensor system 22 can be positioned anywhere in or on the host vehicle 10. The sensor system 22 can at least partially include existing systems of the host vehicle 10, such as backup sensors, lane keeping sensors, and/or front sensors, just to name a few possibilities.

In arrangements in which the sensor system 22 includes a plurality of sensors, the plurality of sensors can be distributed about the host vehicle 10 in any suitable manner. The sensors can work independently from each other or in combination with each other. In such case, the two or more sensors can form a sensor network.

The sensor system 22 can include one or more sensors configured to sense the external environment 12 of the host vehicle 10 or portions thereof. For instance, the sensor system 22 can be configured to acquire data of at least a forward portion and/or at least a rearward portion of the external environment 12 of the host vehicle 10. For example, the sensor system 22 can monitor the forward portion along the longitudinal direction α in front of the host vehicle 10, and/or monitor the rearward portion along the longitudinal direction α behind the host vehicle 10.

Additionally or alternatively, the sensor system 22 can be configured to acquire data of at least a side portion of the external environment 12 of the host vehicle 10. The side portion can be, for example, a portion of the external environment 12 that is located between the forward portion the rearward portion of the host vehicle 10. For example, the sensor system 22 can be configured to monitor a left side and/or a right side portion along a lateral direction β of the host vehicle 10.

The sensor system 22 can be operatively connected to the processor(s) 18, the database(s) 20, the memory 19, and/or any other components, elements, and/or modules of the host vehicle 10. Various examples of possible sensors of the sensor system 22 will be described herein. However, it will be understood that the disclosure is not limited to the particular sensors described. The sensor system 22 can include categories of sensors, such as active sensor(s) 24, passive sensor(s) 26, and/or vehicle kinematic sensor(s) 28.

Active sensor(s) 24 can be any sensor or group of sensors configured to actively radiate a signal for purposes of quantifying or qualifying something. For example, the active sensor(s) 24 can radiate an electromagnetic signal, a radio signal, a laser signal, or the like. Such signals can be radiated into the external environment 12 of the host vehicle 10. Examples of such active sensor(s) 24 can include radar sensor(s) 30, LIDAR sensor(s) 32, or the like.

In one or more arrangements, the active sensor(s) 24 can include one or more radar sensor(s) 30. The radar sensor(s) 30 can be any device, component and/or system that can detect something using at least in part radio signals. The radar sensor(s) 30 can be configured to detect the presence of one or more objects in the external environment 12 of the host vehicle 10, the position of each detected object relative to the host vehicle 10, the distance between each detected object and the host vehicle 10 in one or more directions (e.g. in the longitudinal direction α, the lateral direction β and/or other direction(s)), the elevation of each detected object, the speed of each detected object, and/or the movement of each detected object. The radar sensor(s) 30, or data obtained thereby, can determine or be used to determine the speed, position, and/or orientation of objects in the external environment 12 of the host vehicle 10. The radar sensor(s) 28 can have three dimensional coordinate data associated with the objects.

In one or more arrangements, the active sensor(s) 24 can include LIDAR sensor(s) 32. The LIDAR sensor(s) 32 can be any device, component and/or system that can detect something using at least in part electromagnetic signals. In one or more arrangements, the electromagnetic signals can be laser signals. The LIDAR sensor(s) 32 can include a laser source and/or laser scanner configured to emit a laser signal and a detector configured to detect reflections of the laser signal. The LIDAR sensor(s) 32 may be configured to operate in a coherent or an incoherent detection mode.

The LIDAR sensor(s) 32 can be configured to detect the presence of one or more objects in the external environment of the host vehicle 10, the position of each detected object relative to the host vehicle 10, the distance between each detected object and the host vehicle 10 in one or more directions, the elevation of each detected object, the speed of each detected object, and/or the movement of each detected object. Exemplary LIDAR sensor(s) 32 can include, for example, Velodyne® LIDAR systems.

Passive sensor(s) 26 can be any sensor or group of sensors configured to receive signals broadcast from something independent of the passive sensor(s) 26. Such received signals can be broadcast from something located in the external environment 12 of the host vehicle 10. Additionally or alternatively, such received signals can be broadcast from any component or group of components of the host vehicle 10 independent of the passive sensor(s) 26. For example, the passive sensor(s) 26 can receive electromagnetic signals, radio signals, laser signals, or the like. Examples of such passive sensor(s) 26 can include positioning sensor(s) 34, camera(s) 36, IMU sensor(s) 38, CAN sensor(s) 40, or the like.

In one or more arrangements, the passive sensor(s) 26 can include positioning sensor(s) 34. The positioning sensor(s) 34 can be one or more components or group of components configured to determine the geographic location of the host vehicle 10.

The positioning sensor(s) 34 can include a global positioning system, a local positioning system, and/or a geolocation system. The positioning sensor(s) 34 may include a transceiver configured to estimate a position of the host vehicle 10 with respect to the Earth. For example, positioning sensor(s) 34 can include a GPS transceiver to determine the vehicle's latitude, longitude and/or altitude. The positioning sensor(s) 34 can use other systems (e.g. laser-based localization systems, inertial-aided GPS, and/or camera-based localization) to determine the location of the host vehicle 10. It should understood that many various systems or components can be substituted and/or supplemented to the positioning sensor(s) 34 to determine the location of the host vehicle 10 without departing from the scope of this disclosure.

In one or more arrangements, the passive sensor(s) 26 can include one or more camera(s) 36. The camera(s) 36 can be any device, component, and/or system that can capture visual data. The visual data can include video and/or image information/data. The visual data can be in any suitable form. In one or more arrangements, visual data can include heat signatures, thermal images, and/or thermal video of a portion of the external environment 12 of the host vehicle 10.

The camera(s) 36 can be any suitable type of camera. For instance, the camera(s) 36 can be high resolution cameras, high dynamic range (HDR) cameras, infrared (IR) cameras, and/or thermal imaging cameras.

In one or more arrangements, camera(s) 36 can be positioned to capture visual data from at least a portion of the external environment 12 of the host vehicle 10. In one or more arrangements, camera(s) 36 can be positioned to capture visual data from at least a rearward portion of the external environment of the host vehicle 10. As a further example, camera(s) 36 can be positioned to acquire visual data from at least a left side portion and/or a right side portion of the external environment of the host vehicle 10.

The camera(s) 36 can be located in any suitable portion of the host vehicle 10. For instance, camera(s) 36 can be located within the host vehicle 10. One or more of the camera(s) 36 can be located on the exterior of the host vehicle 10. One or more of the camera(s) 36 can be located on or exposed to the exterior of the host vehicle 10. Additionally or alternatively, one or more of the camera(s) 36 can be located in on a side of the host vehicle 10. As another example, one or more of the camera(s) 36 can be located on the roof of the host vehicle 10.

In one or more arrangements, the camera(s) 36 can be one or more backup cameras. The backup camera can be a camera configured to acquire visual data of a rearward portion of the external environment 12 of the host vehicle 10. In some arrangements, the one or more backup cameras can capture visual data of at least a portion of the rearward portion of the external environment when the host vehicle 10 is not in a reverse gear mode and/or is otherwise moving in reverse. Alternatively or in addition, the camera(s) 36 can include other cameras that may be used in the host vehicle 10.

In one or more arrangements, the passive sensor(s) 26 can include inertial measurement unit (IMU) sensor(s) 38. The IMU sensor(s) 38 can be operatively connected to an IMU (not shown) of the host vehicle 10. The IMU can be one or more mechanisms, devices, elements, components, systems, applications and/or combinations thereof, configured to determine inertial characteristics of the host vehicle 10. Such inertial characteristics can include, for example, velocity, orientation, gravitational forces (G-forces), or the like. The IMU sensor(s) 38 can determine inertial characteristics of the host vehicle 10, using accelerometers, gyroscopes, etc. The IMU sensor(s) 38 can be configured to monitor data received from the IMU of the host vehicle 10.

In one or more arrangements, the passive sensor(s) 26 can include controller area network (CAN) sensor(s) 40. The CAN sensor(s) 40 can be operatively connected to a CAN bus (not shown) of the host vehicle 10. The CAN bus can be one or more components operatively connected to one another, communicating via a network in the host vehicle 10. The network can be a wired network and/or a wireless network. The CAN sensor(s) 40 can be configured to monitor, assess, and/or evaluate data transmitted over the CAN bus of the host vehicle 10.

The vehicle kinematic sensor(s) 28 can be any component or group of components configured to detect a position, velocity, speed, and/or acceleration of the host vehicle 10. The vehicle kinematic sensor(s) 28 can detect the position, velocity, speed, and/or acceleration of the host vehicle 10 using many sensors already present or existing in vehicles. Such sensors can include, for example, tachometer(s), steering angle sensor(s), wheel angle sensor(s), wheel speed sensor(s), or any other sensor(s) capable of detecting the position, velocity, speed, and/or acceleration of the host vehicle 10.

The sensor system 22 can be configured to monitor the external environment 12 of the host vehicle 10, including objects detected in the external environment 12. Responsive to detecting an object in the external environment 12 of the host vehicle 10, the host vehicle 10 can classify the object.

In one or more arrangements, the host vehicle 10 can include an object classification database 42. The object classification database 42 can include data corresponding to the classification of various objects. For example, the object classification database 42 can include data corresponding to features of various vehicles, on-road or off-road objects, and roadway attributes. Such features can be in the form of an image stored on the object classification database 42, a typical reading from the one or more sensors in the sensor system 22 indicative of the particular type of object, and/or any other form of data useful for classifying objects. Examples of various vehicles, on-road or off-road objects, and roadway attributes include, for example, vehicles, motorcycles, trees, pedestrians, bicyclists, animals, roadway signs, barricades, or any other objects typically found on or along a roadway.

The features stored on the object classification database 42 can be compared to data captured from the sensor system 22. For example, an image of a vehicle stored on the object classification database 42 can be compared to images of an object in the external environment 12 captured from the camera(s) 36. Such comparison can be performed by image processing software generally known in the art. The image processing software can be implemented on the processor(s) 18. Responsive to the comparison of the vehicle being substantially the same as the object in the external environment 12, the host vehicle 10 can determine that the object in the external environment 12 is a surrounding vehicle 14.

Additionally or alternatively, the object classification database 42 can store data readings that are typical of the particular type of objects. For example, the object classification database 42 can store data from a typical LIDAR sensor reading indicative of a tree present. The data from the typical LIDAR sensor reading can be compared to data received from the LIDAR sensor(s) 32. Responsive to the comparison of the typical LIDAR sensor reading being substantially the same as the object in the external environment 12 as detected by the LIDAR sensor(s) 32, the host vehicle 10 can determine that the object in the external environment is a tree. Substantially the same can be, for example, within one standard deviation, within half a standard deviation, within a quarter of a standard deviation, etc. Although the previous two examples have been provided for purposes of clarity, any types of data can be stored on the object classification database 42 for comparison to data obtained via the sensor system 22. As a result of the comparison, the objects detected in the external environment 12 of the host vehicle 10 can be classified.

The object classification database 42 can further include data indicative of various types of vehicles. Examples of the types of vehicles can include sedans, sport utility vehicles (SUVs), convertibles, pick-up trucks, semi-trucks, campers, motorcycles, tractors, specific brands or models of vehicles, and/or any other sub-classes of vehicles. Accordingly, responsive to detecting that the object is a surrounding vehicle 14, the host vehicle 10 can determine a type of the surrounding vehicle 14. For example, the processor(s) 18 can receive data from the sensor system 22. The data can be indicative of the object located in the external environment 12 being a surrounding vehicle 14. Responsive to determining the object is the surrounding vehicle 14, the processor(s) 18 can compare the data to various types of vehicles stored on the object classification database 42. The processor(s) 18 can determine that the surrounding vehicle 14 is, for example, a convertible, based on a comparison of the data received from sensor system 22 with data stored on the object classification database 42 indicative of typical sensor readings when a convertible is present in the external environment 12.

The host vehicle 10 can further include a predetermined vehicle characteristics database 44. The predetermined vehicle characteristics database 44 can include one or more predetermined vehicle characteristics for various types of vehicles. The predetermined vehicle characteristics can be indicative of a driving behavior for types of vehicles. The predetermined vehicle characteristics can be indicative of at least one driving behavior associated with a plurality of vehicles having the same type. For example, the predetermined vehicle characteristics for a convertible can be more aggressive as compared to the predetermined vehicle characteristics for a semi-truck.

The predetermined vehicle characteristics can be a number on a scale, a percentage of aggressiveness, a weighted factor as compared to a standard sedan, or any other way of characterizing a driving style. For example, the predetermined vehicle characteristics of the standard sedan can be 50% of aggressiveness, whereas the predetermined vehicle characteristics of a convertible can be 80% of aggressiveness. Additionally or alternatively, the predetermined vehicle characteristics of the standard sedan can be a 1.0 factor of aggressiveness, whereas the predetermined vehicle characteristics of a semi-truck can be a 0.5 factor of aggressiveness. Although the previous two examples have been provided, it should be understood that various weight factors and percentages can be used to correspond with various classes of vehicle, and it is not intended that the weighted for particular classes of vehicles are limited to the examples provided. In fact, many different ways of characterizing driving styles for particular classes of vehicles can be used.

Additionally or alternatively, the predetermined vehicle characteristics can be categorized as driving behaviors for specific maneuvers. For example, the predetermined vehicle characteristics for an SUV may include data indicative that they tend to speed in inclement weather relative to other vehicles, yet drive at average speeds in normal weather, that they tend to prefer the center lane, and tend to change lanes at a slow rate relative to other vehicles. Also, the predetermined vehicle characteristics for a convertible may include data indicative that they tend to drive slower in inclement weather relative to other vehicles, yet driver at faster speeds in normal weather, that they tend to prefer the fast lane, and they tend to change lanes at a fast rate relative to other vehicles. Although the previous two examples are provided, it should be noted that the present disclosure is not limited to these two examples. In fact, any ways of profiling various types of vehicles can be used in the predetermined vehicle characteristics database 44. Additionally, different levels of profiling can be incorporated, including profiling based on the classification of vehicle (e.g., sedan, SUV, convertible, pick-up truck, etc.), the brand of vehicle (e.g., Toyota, Lexus, Honda, Ford, Dodge, etc.), the model of the vehicle (e.g., Toyota Camry, Lexus IS, Honda Accord, Ford Flex, Dodge Charger, etc.), and/or any other levels of profiling that could be used to differentiate driving styles based on specific types of vehicles.

The host vehicle 10 can further include various module(s) 46 for performing various tasks in the host vehicle 10. The module(s) 46 can be implemented as computer readable program code that, when executed by the processor(s) 18, implement one or more of the various processes described herein. Such computer readable program code can be stored on the memory 19. The module(s) 46 can be a component of the processor(s) 18, or the module(s) 46 can be executed on and/or distributed among other processing systems to which the processor(s) 18 are operatively connected. The module(s) 46 can include instructions (e.g., program logic) executable by the processor(s) 18. Additionally or alternatively, the memory 19 can contain such instructions. The various module(s) 46 can be operatively connected to the processor(s) 18, the database(s) 20, and/or the sensor system 22. Various examples of module(s) 46 that the host vehicle 10 can include will be described herein.

In one or more arrangements, the host vehicle 10 can include a driver behavior module 48. The driver behavior module 48 can receive the predetermined vehicle characteristics from the predetermined vehicle characteristics database 44 to determine a driver behavior of identified surrounding vehicles 14.

Additionally or alternatively, the driver behavior module 48 can receive data from the sensor system 22. The data received from the sensor system 22 can be indicative of the driver behavior of the identified surrounding vehicles 14. In such an example, data received from the sensor system 22 can be used to both classify objects located in the external environment, and to determine the driver behavior of surrounding vehicles 14. The driver behavior module 48 can use both the predetermined vehicle characteristics received from the predetermined vehicle characteristics database 44, and data received from the sensor system 22 to determine driver behaviors. Such data received from the sensor system 22 can be determinative or used to determine current driving characteristics for the surrounding vehicle 14. The current driving characteristics can be indicative of one or more driving behaviors. For example, the current driving characteristics can be a number on a scale, a percentage of aggressiveness, a weighted factor as compared to a standard sedan, or any other way of characterizing one or more driving behaviors for the surrounding vehicle 14 based on data obtained from the sensor system 14. Examples of such data include changes in direction, speed, acceleration, lane position, and/or any other types of data that can be useful to determine driver behavior of the surrounding vehicle 14.

In one or more arrangements, the current driving characteristics can be substantially the same as the predetermined vehicle characteristics for the surrounding vehicle 14. In such an example, the surrounding vehicle 14 has one or more driving behaviors consistent with the type of the surrounding vehicle. In one or more arrangements, the current driving characteristics can be different from the predetermined vehicle characteristics. In such an example, the surrounding vehicle 14 does not portray the one or more driving behavior consistent with the type of the surrounding vehicle. The driver behavior module 48 can use both the predetermined vehicle characteristics received from the predetermined vehicle characteristics database 44, and data received from the sensor system 22 to determine driver behaviors.

The host vehicle 10 can further include an identified vehicle database 50. The host vehicle 10 can record an identifier for the surrounding vehicle 14. Such identifier can include, for example, a license plate number, a vehicle identification number, or any other types of identifiers commonly used to differentiate between individual vehicles. The identifier can be stored on the identified vehicle database 50. Additionally or alternatively, the predetermined vehicle characteristics for the surrounding vehicle 14 can also be stored on the identified vehicle database 50. In such an example, the predetermined vehicle characteristics can be associated with the identifier, and both the identifier and the associated predetermined vehicle characteristics can be stored on the identified vehicle database 50.

In one or more arrangements, the host vehicle 10 can include a surrounding vehicle trajectory prediction module 52. The surrounding vehicle trajectory prediction module 52 can predict a trajectory for the surrounding vehicle 14 based on any one of the predetermined vehicle characteristics for the surrounding vehicle 14, and the current driving characteristics based on the data received from the sensor system 22. Referring now to FIG. 1 and FIG. 2, the surrounding vehicle 14 is shown in the left lane relative to the host vehicle 10. The host vehicle 10 can determine the type of the surrounding vehicle 14, for example, a convertible. The host vehicle 10 can also detect, using data received from the sensor system 22, that the surrounding vehicle 14 has accelerated relative to the host vehicle 10, and that the surrounding vehicle 14 has shifted its position laterally towards the lane marker directly adjacent to and in-between the host vehicle 10 and the surrounding vehicle 14. Additionally or alternatively, the host vehicle 10 can access map data from a navigation unit 54 of the host vehicle 10, which would indicate that the left lane is ending ahead. The host vehicle 10 can use the data received from any one of the predetermined vehicle characteristics database 44, the sensor system 22, and the map data from the navigation unit 54 to predict the trajectory 16 of the surrounding vehicle 14. The navigation unit 54 can be integrated into a head-unit (not shown) of the host vehicle 10, or it can be a stand-alone, or aftermarket, component. The navigation unit 54 can include the map data stored thereon (e.g., stored on a database included in the navigation unit 54), or the host vehicle 10 can further include a map database 56. Additionally or alternatively, the navigation unit 54 can be integrated into an occupants mobile device, and the map data can be stored thereon. In such an example, the host vehicle 10 can access the occupant's mobile device, and retrieve the map data stored thereon.

Additionally, each of the types of data received may have a corresponding confidence level. Referring now to FIG. 2, the surrounding vehicle trajectory prediction module 52 can evaluate the confidence levels of the predetermined vehicle characteristics, the current driving characteristics, and the map data. Such confidence levels can be used to optimize the predicted trajectory 16 for the surrounding vehicle 14. For example, if some of the sensors in the sensor system 22 are not performing optimally, or are in a failed state, the current driving characteristics may have a lower confidence level. The confidence level may be a scaled number, a percentage confidence, a weighted factor, or any other way of characterizing a level of confidence in data.

The surrounding vehicle trajectory prediction module 52 can evaluate the confidence levels for any of the predetermined vehicle characteristics, the current driving characteristics, and the map data for the surrounding vehicle 14, and predict the trajectory 16 for the surrounding vehicle 14. In one or more arrangements, the predicted trajectory 16 can also have a corresponding confidence level. Much like the previously described confidence levels, the confidence level for the predicted trajectory 16 can be a scaled number, a percentage confidence, a weighted factor, or any other way of characterizing a level of confidence in data.

In one or more arrangements, the host vehicle 10 can include a database update module 58. The database update module 58 can be configured to update any of the database(s) 20. Such an update can be performed based on various factors. In one or more arrangements, the database update module 58 can receive a prompt for an update. Such a prompt can be received similar methods typically used to update software and databases generally known in the art. For example, the prompt can be received at a car dealership, or wirelessly.

In one or more arrangements, the database update module 58 can determine that an update is necessary. Such determination can be made for specific types of vehicles, or for specifically identified vehicles. Accordingly, in such an example, the database update module 58 can update any one of the predetermined vehicle characteristics database 44, and the identified vehicle database 50. The database update module 58 can compare the predetermined vehicle characteristics for the surrounding vehicle 14 with the identified driving characteristics of the surrounding vehicle 14. Where the predetermined vehicle characteristics and the identified driving characteristics are different, the database update module 58 can determine that an update to any one of the predetermined vehicle characteristics database 44, and the identified vehicle database 50. For example, the database update module 58 can update the identified vehicle database 50 responsive to the identified driving characteristics being different from the predetermined vehicle characteristics, and the identified driving characteristics are not within, for example, one standard deviation of the predetermined vehicle characteristics, two standard deviations of the predetermined vehicle characteristics, three standard deviations of the predetermined vehicle characteristics, etc. The database update module 58 can update the predetermined vehicle characteristics stored on the identified vehicle database 50 corresponding to the identifier, the identifier corresponding to the surrounding vehicle 14. Additionally or alternatively, the database update module 58 can update the predetermined vehicle characteristics database 44 responsive to the identified driving characteristics being different from the predetermined vehicle characteristics, but is, for example, within one standard deviation of the predetermined vehicle characteristics.

The host vehicle 10 can include a safe trajectory determination module 60. The safe trajectory determination module 60 can determine a safe trajectory for the host vehicle 10 to follow. The safe trajectory can be, for example, a trajectory where the host vehicle 10 will not cross the predicted trajectory 16 for the surrounding vehicle 14. In some instances, such safe trajectory can be following a previously planned trajectory for the vehicle when the previously planned trajectory of the host vehicle 10 is determined as being safe. The safe trajectory can be determined using any of the predicted trajectory from the surrounding vehicle trajectory prediction module 52, the current driving characteristics from the sensor system 22, the predetermined vehicle characteristics from the predetermined vehicle characteristics database 44 based on the type of the surrounding vehicle 14, the map data from the navigation unit 54, and any other data usable to determine the safe trajectory of the surrounding vehicle. The safe trajectory can include a confidence level. The confidence level for the safe trajectory can be a scaled number, a percentage confidence, a weighted factor, or any other way of characterizing a level of confidence in data.

The host vehicle 10 can follow the safe trajectory responsive to one or more of the sensors in the sensor system 22 changing from an active state to a failed state. The active state can be actively, consistently, periodically, and/or predictably receiving reliable data from the sensor. The failed state can be inconsistently receiving data, receiving unreliable or outlying data, the sensor being in a deactivated state, the sensor being in a passive state, the sensor being in a sleep mode, etc. An example of a sensor being in a failed state can be an instance where it is snowing outside of the vehicle, and some sensors (e.g., camera(s) 36, radar sensor(s) 30) may receive unreliable data. In these instances, the sensors receiving unreliable data can be considered in the failed state. Responsive to one or more of the sensors in the sensor system 22 being in the failed state, the host vehicle 10 can follow the safe trajectory.

Additionally or alternatively, the host vehicle 10 can follow the safe trajectory responsive to one of the categories of sensors (e.g., the active sensor(s) 24, the passive sensor(s) 26, the vehicle kinematic sensor(s) 28) being in the failed state. In one or more arrangements, the host vehicle 10 can use the safe trajectory and the sensors in the active state, when one or more of the categories are in the failed state. For example, when the active sensor(s) 24 are in the failed state, and the passive sensor(s) 26, and vehicle kinematic sensor(s) 28 are in the active state, the safe trajectory determination module 60 can determine the safe trajectory based on the predicted trajectory as determined by the surrounding vehicle trajectory prediction module 52, the passive sensor(s) 26, and the vehicle kinematic sensor(s) 28. Also, where the passive sensor(s) 26 are in the failed state, and the active sensor(s) 24 and the vehicle kinematic sensor(s) 28 are in the active state, the safe trajectory determination module 60 can determine the safe trajectory based on the predicted trajectory as determined by the surrounding vehicle trajectory prediction module 52, the active sensor(s) 24, and the vehicle kinematic sensor(s) 28. Also, where both the active sensor(s) 24 and passive sensor(s) 26 are in the failed state, and the vehicle kinematic sensor(s) 28 are in the active state, the safe trajectory determination module 60 can determine the safe trajectory based on the predicted trajectory as determined by the surrounding vehicle trajectory prediction module 52, and the vehicle kinematic sensor(s) 28.

The host vehicle 10 can include a fail-safe module 62. In instances where the safe trajectory includes the confidence level, the fail-safe module 62 can compare the confidence level for the safe trajectory to a threshold. The threshold can be, for example, a threshold scaled number, a threshold percentage confidence, a threshold weighted factor, or any other way of setting a threshold for a level of confidence in data. Where the confidence level for the safe trajectory is, for example, below the threshold confidence level, the host vehicle 10 can execute a fail-safe. Such threshold can be a minimum level of confidence, otherwise the host vehicle 10 executes the fail-safe. Alternatively, a maximum level of unconfidence (e.g., inverse of confidence) can be used as a threshold, where if the confidence level is above the maximum level of unconfidence threshold, the host vehicle 10 executes the fail-safe. The fail-safe can be, for example, stopping the host vehicle 10, pulling the host vehicle 10 over to a side of the road, slowing the host vehicle 10 down, idling the host vehicle 10, or any other fail-safes for the host vehicle 10 to safely disable, stop, and/or inhibit the host vehicle 10 from moving.

Now that the various potential systems, devices, elements and/or components of the host vehicle 10 have been described, various methods will now be described. Various possible steps of methods will now be described. The method illustrated in FIG. 3 may be applicable to the arrangements described above in relation to FIGS. 1-2 and 4, but it is understood that the method can be carried out with other suitable systems and arrangements. Moreover, the method may include other steps that are not shown here, and in fact, the methods are not limited to including every step shown in FIG. 3. The steps that are illustrated herein as part of the method are not limited to this particular chronological order. Indeed, some of the steps may be performed in a different order than what is shown and/or at least some of the steps shown can occur simultaneously.

Figure 3:
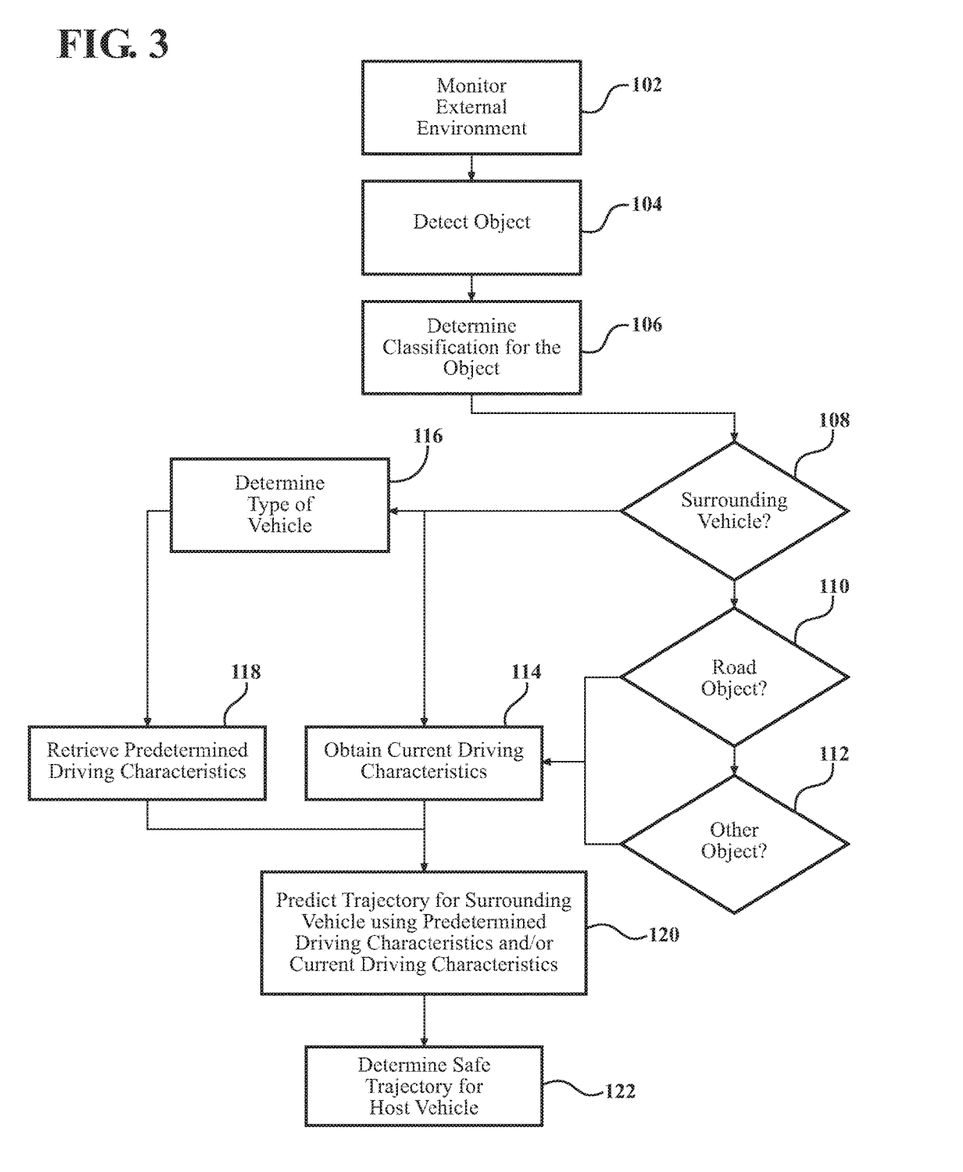
FIG. 3 is a flow diagram of an example method for predicting a trajectory of the surrounding vehicle that can be implemented in the host vehicle of FIGS. 1A and 1B according to one aspect of the disclosure.

Referring now to FIG. 3, a flow diagram of an example method 100 for predicting the trajectory 16 of the surrounding vehicle 14 that can be implemented in the host vehicle 10 is shown. The method 100 begins at block 102. At block 102, the host vehicle 10 can monitor the external environment 12 as the host vehicle 10 travels along the roadway. The host vehicle 10 can monitor the external environment 12 using the sensor system 22. The sensor system 22 can include two or more sensors. The method 100 can continue to block 104.

At block 104, the host vehicle 10 can detect an object in the external environment 12 of the host vehicle 10. Once an object is detected in the external environment 12 of the host vehicle 10, the method can continue to block 106.

At block 106, the host vehicle 10 can determine a classification for the object. The classification can be a predicted class or type of object. The classification can be determined by retrieving data stored on the object classification database 42, and comparing the data stored on the object classification database 42 with the data received from the sensor system 22.

In one or more arrangements, the object classification database 42 can include data corresponding to the classification of various objects. For example, the object classification database 42 can include data corresponding to features of various objects. Such features can be in the form of an image stored on the object classification database 42, a typical reading from the one or more sensors in the sensor system 22 indicative of the particular type of object, or any other type of data that can be useful for classifying objects.

As a result of such comparison, the host vehicle 10 can determine, at block 108, whether the object is a surrounding vehicle, at block 110, whether the object is a road feature or object, and, at block 112, whether the object is a different object other than a surrounding vehicle or road feature or object.

At block 108, if the object is determined to be a surrounding vehicle 14, the method can proceed to block 114, and block 116.

At block 114, the host vehicle 10 can obtain one or more current driving characteristics for the surrounding vehicle 14. The current driving characteristics can be indicative of one or more driving behaviors for the surrounding vehicle 14.

In one or more arrangements, the current driving characteristics can be obtained using data received from the sensor system 22. The data can be, for example, acceleration profiles, speed preferences, average distance to lane markers, average turn speeds, and/or other ways of characterizing or indicating one or more driving behaviors.

At block 116, the host vehicle 10 can determine the type of the surrounding vehicle 14. In one or more arrangements, the host vehicle 10 can determine the type of the surrounding vehicle in a similar manner as described with reference to block 106 for determining the classification of the object. For example, the host vehicle 10 can compare data received from the sensor system 22 with data stored on the object classification database 42. The object classification database 42 can further include data indicative of various types of vehicles. Accordingly, responsive to detecting that the object is a surrounding vehicle 14, the host vehicle 10 can determine a type of the surrounding vehicle 14. For example, the host vehicle 10 can receive data from the sensor system 22. The data can be indicative of the object located in the external environment 12 being a surrounding vehicle 14. Responsive to determining the object is the surrounding vehicle 14, the vehicle 14 can compare the data to various types of vehicles stored on the object classification database 42. The vehicle 14 can determine that the surrounding vehicle 14 is, for example, a convertible based on a comparison of the data received from sensor system 22 to data stored on the object classification database 42 indicative of typical sensor readings when a convertible is present in the external environment 12. When the host vehicle 10 determines the type of the surrounding vehicle 14, the method can proceed to block 116.

At block 118, the host vehicle 10 can retrieve one or more predetermined vehicle characteristics for the surrounding vehicle 14. The one or more predetermined vehicle characteristics can be indicative of at least one driving behavior associated with a plurality of vehicles having the same type. For example, the one or more retrieved predetermined vehicle characteristics for the surrounding vehicle 14 can be the one or more retrieved predetermined vehicle characteristics for the determined type of the surrounding vehicle 14.

In one or more arrangements, the predetermined vehicle characteristics can be stored on the predetermined vehicle characteristics database 42. In one or more arrangements, the host vehicle 10 can compare the current driving characteristics with the predetermined vehicle characteristics for the surrounding vehicle 14. As a result of such comparison, the host vehicle 10 can update the predetermined vehicle characteristics database 42. The update can be, for example, replacing the predetermined vehicle characteristics with the current driving characteristics, averaging the predetermined vehicle characteristics with the current driving characteristics, applying a factor to any one of the predetermined vehicle characteristics or the current driving characteristics then averaging the predetermined vehicle characteristics and the current driving characteristics, or any other way to revise the predetermined vehicle characteristics to reflect the current driving characteristics.

In one or more arrangements, the host vehicle 10 can record the identifier for the surrounding vehicle 14. The identifier can be, for example, a license plate number, a VIN number, or any other way of differentiating between specific vehicles. The identifier can be associated with the predetermined vehicle characteristics for the surrounding vehicle 14. In one or more arrangements, both the identifier, and the associated predetermined vehicle characteristics can be stored on the identified vehicle database 50. In such an arrangement, the host vehicle 10 can compare the predetermined vehicle characteristics stored on the identified vehicle database 50 with the current driving characteristics. The host vehicle 10 can update the predetermined vehicle characteristics stored on the identified vehicle database 50 based on the comparison.

At block 110 and block 112, the host vehicle 10 can determine that the object in the external environment 12 of the host vehicle 10 is a road object, or an object not a surrounding vehicle or a road feature or object. In either event, the method 100 continues back to block 114.

At block 114, in instances where the object in the external environment 12 is a road feature or object, or an object that is not a surrounding vehicle or a road object, the host vehicle 10 can evaluate the current driving characteristics for the surrounding vehicle as they relate to the object. Such evaluation can be used to refine the current driving characteristics for the surrounding vehicle. The method 100 can continue to block 120.

At block 120, the host vehicle 10 can predict a trajectory for the surrounding vehicle 14 based on any one of the predetermined vehicle characteristics for the surrounding vehicle 14, and the current driving characteristics based on the data received from the sensor system 22. In one or more arrangements, the current driving characteristics and/or the predetermined vehicle characteristics can include a confidence level. Such confidence levels can be used to optimize the predicted trajectory 16 for the surrounding vehicle 14. The confidence level for the predicted trajectory can be a scaled number, a percentage confidence, a weighted factor, and/or any other way of characterizing a level of confidence in data The respective confidence levels for the current driving characteristics and/or the predetermined vehicle characteristics can be evaluated. As a result of such evaluation, in one or more arrangements, the host vehicle 10 can predict the trajectory for the surrounding vehicle 14 that is the most confident. The method 100 can continue to 122.

At block 122, the host vehicle 10 can predict a safe trajectory for the host vehicle 10. In one or more arrangements, the safe trajectory can be an estimated safe trajectory for the host vehicle 10 based on the predicted trajectory for the surrounding vehicle 14.

In one or more arrangements, the host vehicle 10 can detect at least one sensor of the sensor system 14 being in a failed state. Such failed state can be, for example, inconsistently receiving data, receiving unreliable or outlying data, the sensor being in a deactivated state, etc. In one or more arrangements, the host vehicle 10 can follow the safe trajectory responsive to detecting the failed state. Additionally or alternatively, when the host vehicle 10 detects the sensor in the failed state, the host vehicle 10 can initiate a timer to time a duration of the failed state. Such duration can be compared to a threshold duration. Responsive to the duration being greater than the threshold, in one or more arrangements, the host vehicle 10 can execute a fail-safe. The fail-safe can be, for example, stopping the host vehicle 10, pulling the host vehicle 10 over to a side of the road, slowing the host vehicle 10 down, idling the host vehicle 10, or any other fail-safes for the host vehicle 10 to safely disable, stop, and/or inhibit the host vehicle 10.

Referring now to FIG. 4A-4D, and FIG. 2, the host vehicle 10 can monitor the external environment 12 of the host vehicle 10. The host vehicle 10 can use the sensor system 22 to monitor the external environment 12 of the host vehicle 10. As shown in FIG. 4A-4D, there may be three objects in the external environment 12 of the host vehicle 10. The host vehicle 10 can use data received from the sensor system 22 to classify these objects. As previously described, the processor(s) 18 can compare the data received from the sensor system 22 with the data stored on the object classification database. As a result of such comparison, the processor(s) 18 can determine that the objects in the external environment 12 are a first surrounding vehicle 64, a second surrounding vehicle 66, and a third surrounding vehicle 68.

After determining that the objects are most likely surrounding vehicles, the processor(s) 18 can then compare data received from the sensor system 22 corresponding with the first surrounding vehicle 64, the second surrounding vehicle 66, and the third surrounding vehicle 68 with types of vehicles stored on the object classification database 42. As a result of such additional comparison, the processor(s) 18 can further determine that, for example, the first surrounding vehicle 64 is a sedan, the second surrounding vehicle 66 is a convertible, and the third surrounding vehicle is an SUV. Responsive to determining that the three surrounding vehicles 64, 66, 68 are the sedan, convertible, and the SUV, respectively, the driver behavior module 48 can determine the driver behavior for each of the first, second, and third surrounding vehicles 64, 66, 68. Such determination can be based on the predetermined vehicle characteristics for the types of the surrounding vehicles (e.g., the predetermined vehicle characteristics for a sedan for the first surrounding vehicle 64, the predetermined vehicle characteristics for a convertible for the second surrounding vehicle 66, and the predetermined vehicle characteristics for an SUV for the third surrounding vehicle).

Figure 4A:
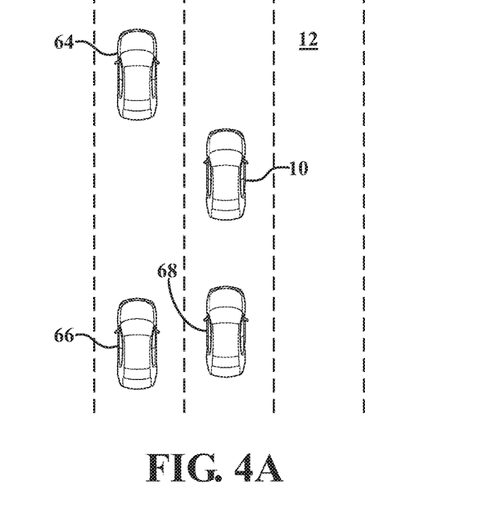
FIG. 4A-4D are top views of an example of the roadway including the host vehicle of FIGS. 1A and 1B having the external environment and a plurality of surrounding vehicles located therein according to one aspect of the disclosure.
Figure 4B:
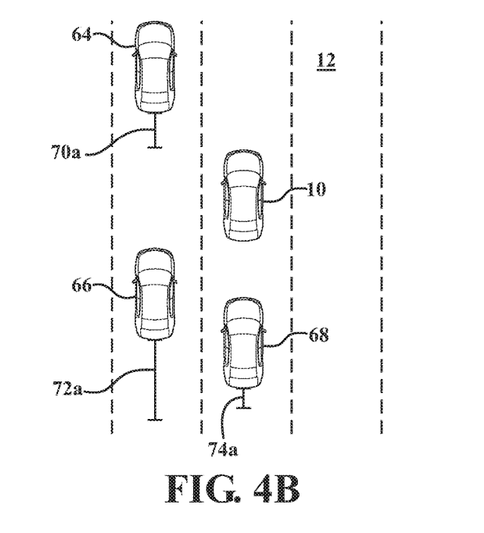
Figure 4C:
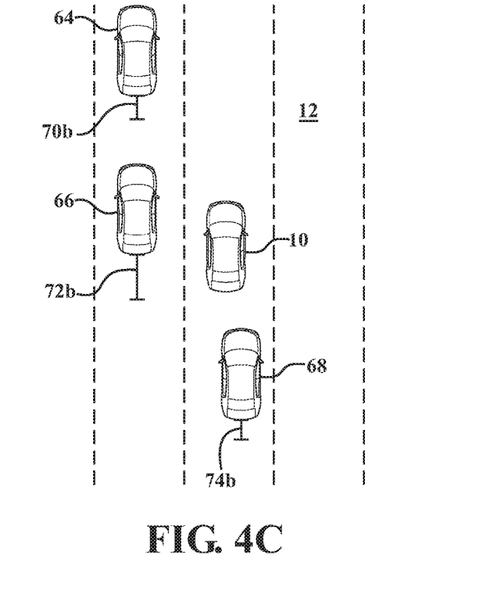
Figure 4D:
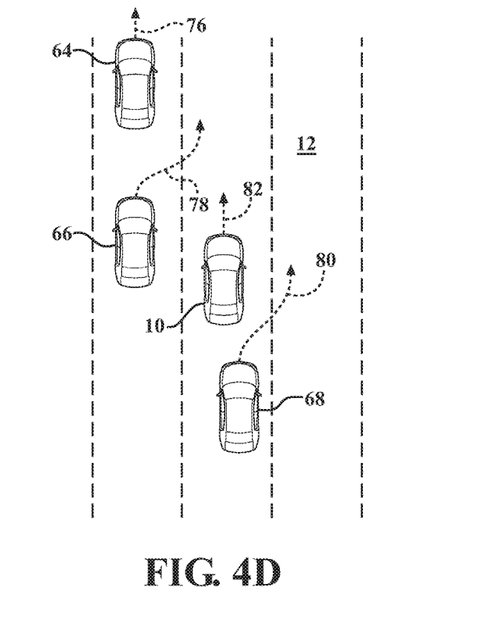

Alternatively or additionally, determining the driver behavior for each of the first, second, and third surrounding vehicles 64, 66, 68 can be made based on the current driving characteristics. Such current driving characteristics can be seen in the progression of FIG. 4A-FIG. 4C. As shown, the first surrounding vehicle 64 moves from a first position shown in FIG. 4A to a second position shown in FIG. 4B, the difference of which is represented by differential 70a. Likewise, the progression from the second position to a third position shown in FIG. 4C is represented by differential 70b. The second surrounding vehicle 66 moves from a first position shown in FIG. 4A to a second position shown in FIG. 4B, the difference of which is represented by differential 72a. Likewise, the progression from the second position to a third position shown in FIG. 4C is represented by differential 72b. The third surrounding vehicle 68 moves from a first position shown in FIG. 4A to a second position shown in FIG. 4B, the difference of which is represented by differential 74a. Likewise, the progression from the second position to a third position shown in FIG. 4C is represented by differential 74b. These shifts in position can be quantified and qualified by the sensor system 22, and used by the driver behavior module 48 to evaluate what kind of driving style each surrounding vehicle 64, 66, 68 has.

Based on the driver behavior for each of the first, second, and third surrounding vehicles 64, 66, 68, the host vehicle 10 can predict a trajectory, 76, 78, 80 for each of the surrounding vehicles 64, 66, 68, respectively. Such prediction can be made by the surrounding vehicle trajectory prediction module 52. As previously stated, the prediction can be based on a confidence level of each of the types of data evaluated by the driver behavior module 48.

The host vehicle 10 can determine a safe trajectory 82 for the host vehicle 10 to follow, based on the predicted trajectory 76, 78, 80 for each of the first, second, and third surrounding vehicles 64, 66, 68. The host vehicle 10 can follow the safe trajectory 82, responsive to detecting one or more of the sensors in the sensor system 22 being in a passive, or failed state.

It will be appreciated that arrangements described herein can provide numerous benefits, including one or more of the benefits mentioned herein. For example, arrangements described herein can provide additional resources for vehicles to predict surrounding vehicle behavior. Arrangements described herein can update databases in the vehicle to provide for more accurate classification of objects. Arrangements described herein can update databases in the vehicle to provide for more accurate prediction of driving behaviors for surrounding vehicles. Arrangements described herein mitigate the necessity to execute fail-safe procedures in the vehicle, responsive to detecting one or more sensors being in an active state. Arrangements described herein can provide a safe trajectory for the vehicle to follow in response to one or more sensors being in a failed state.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing.

Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method for operating a host vehicle on a roadway, comprising:
   detecting, using a sensor system in the host vehicle, an object in an external environment of the host vehicle;
   determining a classification for the object;
   if the determined classification for the object is a vehicle in the external environment surrounding the host vehicle, performing the following:
      determining a type of the surrounding vehicle;
      obtaining one or more current driving characteristics of the surrounding vehicle as it travels on the roadway using the sensor system;
   retrieving, from a first database, one or more predetermined vehicle characteristics for the determined type, the one or more predetermined vehicle characteristics indicative of at least one driving behavior associated with a plurality of vehicles having the determined type;
   predicting a trajectory of the surrounding vehicle on the roadway based on at least one of the one or more current driving characteristics or the one or more predetermined vehicle characteristics;
   comparing the one or more predetermined vehicle characteristics for the surrounding vehicle with the one or more current driving characteristics; and
   updating the first database based on the comparison.

2. A method for operating a host vehicle on a roadway, comprising:
   detecting, using a sensor system in the host vehicle, an object in an external environment of the host vehicle;
   determining a classification for the object;
   if the determined classification for the object is a vehicle in the external environment surrounding the host vehicle, performing the following:
      determining a type of the surrounding vehicle;
      obtaining one or more current driving characteristics of the surrounding vehicle as it travels on the roadway using the sensor system;
   retrieving, from a first database, one or more predetermined vehicle characteristics for the determined type, the one or more predetermined vehicle characteristics indicative of at least one driving behavior associated with a plurality of vehicles having the determined type;
   predicting a trajectory of the surrounding vehicle on the roadway based on at least one of the one or more current driving characteristics or the one or more predetermined vehicle characteristics;
   recording an identifier for the surrounding vehicle;
   associating the predetermined vehicle characteristics with the identifier for the surrounding vehicle;
   storing the identifier and the associated predetermined vehicle characteristics for the surrounding vehicle on a second database;
   comparing the one or more predetermined vehicle characteristics for the surrounding vehicle with the one or more current driving characteristics; and
   updating the second database based on the comparison.

3. The method of claim 1, wherein the determined type is at least one of a vehicle classification, a vehicle size, a vehicle make, or a vehicle model.

4. A method for operating a host vehicle on a roadway, comprising:
   detecting, using a sensor system including one or more sensors in the host vehicle, an object in an external environment of the host vehicle;
   determining a classification for the object;
   if the determined classification for the object is a vehicle in the external environment surrounding the host vehicle, performing the following:
      determining a type of the surrounding vehicle;
      obtaining one or more current driving characteristics of the surrounding vehicle as it travels on the roadway using the sensor system;
   retrieving, from a first database, one or more predetermined vehicle characteristics for the determined type, the one or more predetermined vehicle characteristics indicative of at least one driving behavior associated with a plurality of vehicles having the determined type;
   predicting a trajectory of the surrounding vehicle on the roadway based on at least one of the one or more current driving characteristics or the one or more predetermined vehicle characteristics;
   determining a safe trajectory for the host vehicle responsive to predicting the trajectory of the surrounding vehicle;
   detecting at least one of the sensors of the sensor system being in a failed state; and
   causing the host vehicle to follow the safe trajectory responsive to detecting the at least one of the one or more sensors of the host vehicle being in the failed state.

5. The method of claim 4, further comprising:
   comparing a duration of the at least one of the one or more sensors of the host vehicle being in the failed state to a threshold; and
   executing a fail-safe maneuver responsive to the duration being greater than the threshold.

6. The method of claim 4, wherein the safe trajectory is an estimated safe trajectory of the host vehicle based on the predicted trajectory of the surrounding vehicle.

7. A system for operating a host vehicle on a roadway comprising:
   a sensor system configured to monitor an external environment of the host vehicle as the host vehicle travels along the roadway, wherein the sensor system includes an active sensor system including one or more active sensors, and a passive sensor system including one or more passive sensors;
   a first database including one or more predetermined vehicle characteristics indicative of at least one driving behavior associated with a plurality of vehicles having a determined type; and
   a processor being programmed to execute instructions stored on a memory including:
   detecting, using the sensor system, an object in the external environment of the host vehicle;
   determining a classification for the object;
   if the determined classification for the object is a vehicle surrounding the host vehicle, performing the following:
   determining the type of the surrounding vehicle;
      detecting any one of the active sensors or passive sensors being in a failed state; wherein,
         if the sensor in the failed state is any one of the active sensors, obtaining one or more current driving characteristics of the surrounding vehicle as it travels along the roadway using the passive sensor system;
         if the sensor in the failed state is any one of the passive sensors, obtaining one or more current driving characteristics of the surrounding vehicle as it travels along the roadway using the active sensor system;
   retrieving, from the first database, the predetermined vehicle characteristics for the determined type of the surrounding vehicle; and
   predicting a trajectory of the surrounding vehicle based on at least one of the one or more current driving characteristics or the predetermined vehicle characteristics.

8. A system for operating a host vehicle on a roadway comprising:
   a sensor system configured to monitor an external environment of the host vehicle as the host vehicle travels along the roadway;
   a first database including one or more predetermined vehicle characteristics indicative of at least one driving behavior associated with a plurality of vehicles having a determined type; and
   a processor being programmed to execute instructions stored on a memory including:
   detecting, using the sensor system, an object in the external environment of the host vehicle;
   determining a classification for the object;
   if the determined classification for the object is a vehicle surrounding the host vehicle, performing the following:
   determining the type of the surrounding vehicle;
   obtaining one or more current driving characteristics of the surrounding vehicle as it travels along the roadway using the sensor system;
   retrieving, from the first database, the predetermined vehicle characteristics for the determined type of the surrounding vehicle;
   predicting a trajectory of the surrounding vehicle based on at least one of the one or more current driving characteristics or the predetermined vehicle characteristics;
   comparing the predetermined vehicle characteristics of the surrounding vehicle with the current driving characteristics; and
   updating the predetermined vehicle characteristics based on the comparison.

9. The system of claim 8, further comprising:
   a second database; wherein the executable operations further include:
   recording an identifier for the surrounding vehicle;
   associating the identifier with the predetermined vehicle characteristics for the surrounding vehicle;
   storing the associated identifier and the predetermined vehicle characteristics for the surrounding vehicle on the second database; and
   wherein updating the predetermined vehicle characteristics includes updating the predetermined vehicle characteristics stored on the second database based on the comparison.

10. A system for operating a host vehicle on a roadway comprising:
   a sensor system configured to monitor an external environment of the host vehicle as the host vehicle travels along the roadway;
   a first database including one or more predetermined vehicle characteristics indicative of at least one driving behavior associated with a plurality of vehicles having a determined type; and
   a processor being programmed to execute instructions stored on a memory including:
   detecting, using the sensor system, an object in the external environment of the host vehicle;
   determining a classification for the object;
   if the determined classification for the object is a vehicle surrounding the host vehicle, performing the following:
   determining the type of the surrounding vehicle;
   obtaining one or more current driving characteristics of the surrounding vehicle as it travels along the roadway using the sensor system;
   retrieving, from the first database, the predetermined vehicle characteristics for the determined type of the surrounding vehicle;
   predicting a trajectory of the surrounding vehicle based on at least one of the one or more current driving characteristics or the predetermined vehicle characteristics;
   determining a safe trajectory for the host vehicle responsive to predicting the trajectory of the surrounding vehicle;
   detecting at least one sensor of the sensor system being in a failed state; and
   causing the host vehicle to follow the safe trajectory responsive to at least one sensor of the sensor system being in the failed state.

11. The system of claim 10, wherein the executable operations further include:
   responsive to detecting the failed state, comparing a duration of the failed state to a threshold; and
   executing a fail-safe maneuver responsive to the duration of the failure being greater than the threshold.

12. A method for operating a host vehicle on a roadway, comprising:
   detecting an object in an external environment of the host vehicle using a sensor system;
   determining a classification for the object;
   if the determined classification for the object is a vehicle surrounding the host vehicle, performing the following:
   determining one or more characteristics for the surrounding vehicle indicative of at least one driving behavior;
   predicting a trajectory of the surrounding vehicle on the roadway based on the one or more characteristics;
   comparing the one or more current driving characteristics of the surrounding vehicle with the retrieved predetermined vehicle characteristics; and
   updating the first database based on the comparison.

13. The method of claim 12, further comprising:
determining a type of the surrounding vehicle; and
retrieving, from a first database, one or more predetermined vehicle characteristics for the determined type of the surrounding vehicle, the one or more predetermined vehicle characteristics indicative of at least one driving behavior associated with a plurality of vehicles having the determined type; wherein
determining the one or more characteristics for the surrounding vehicle is determining the one or more characteristics for the surrounding vehicle based on the retrieved predetermined vehicle characteristics.

14. The method of claim 13, further comprising:
obtaining one or more current driving characteristics of the surrounding vehicle as it travels along the roadway using the sensor system; wherein
determining the one or more characteristics for the surrounding vehicle is determining the one or more characteristics for the surrounding vehicle based on at least one of the one or more current driving characteristics, or the retrieved predetermined vehicle characteristics.

15. A method for operating a host vehicle on a roadway, comprising:
detecting an object in an external environment of the host vehicle using a sensor system;
determining a classification for the object;
if the determined classification for the object is a vehicle surrounding the host vehicle, performing the following:
determining one or more characteristics for the surrounding vehicle indicative of at least one driving behavior;
predicting a trajectory of the surrounding vehicle on the roadway based on the one or more characteristics;
detecting at least one sensor of the sensor system of the vehicle being in a failed state; and
causing the vehicle to follow a safe trajectory responsive to detecting the failed state.

* * * * *